United States Patent [19]

Ashton

[11] Patent Number: 4,887,864
[45] Date of Patent: Dec. 19, 1989

[54] MODULAR AUTOMOTIVE SEAT FRAME

[76] Inventor: Thomas Ashton, 4909 - 18th St. SE., Rochester, Minn. 55904

[21] Appl. No.: 215,323

[22] Filed: Jul. 5, 1988

[51] Int. Cl.⁴ ............................................. B60N 1/02
[52] U.S. Cl. ................................. 297/375; 297/452; 297/232
[58] Field of Search ............... 297/452, 458, 459, 460, 297/411, 232, 396, 375, 354, 361, 363, 364, 90

[56] References Cited
U.S. PATENT DOCUMENTS

| 2,750,994 | 6/1956 | Howell, Jr. | 297/375 |
| 3,363,943 | 1/1968 | Getz et al. | 297/452 |
| 3,655,241 | 4/1972 | Herzer et al. | 297/396 X |
| 4,592,591 | 6/1986 | Wiers | 297/375 |
| 4,595,238 | 6/1986 | Goldner | 297/452 |
| 4,695,097 | 9/1987 | Muraishi | 297/452 |

Primary Examiner—James T. McCall
Attorney, Agent, or Firm—Douglas L. Tschida

[57] ABSTRACT

Modularly arranged seat frameworks supporting of custom upholstered seat cushions and mountable in a variety of makes, models and years of automoboiles. Cable-actuated, spring release means coupled between the backrest and bench frame portions to at least one hinge member facilitate a recliner adjustment of one to the other. Included mounting brackets support a seat belt retractor to the backrest framework with the extreme ends of the belt coupling to the automotive frame.

12 Claims, 3 Drawing Sheets

4,887,864

MODULAR AUTOMOTIVE SEAT FRAME

BACKGROUND OF THE INVENTION

The present invention relates to automotive seats and, in particular, to an upholstery framework adaptable to a variety of makes and models of street rod and kit-type automobiles for supporting custom upholstered seat cushions therefrom.

With the growing popularity in the leisure pastime surrounding the building of street rods, and in particular the customizing of such vehicles for show and personal use, has evolved a need and market for pre-fabricated seat assemblies which may be readily adapted to a variety of makes and models of automobiles. This especially holds true for a variety of kit cars and early Fords[TM] from the pre and post-1949 era and for which custom upholstered cushions are desired, but at affordable prices.

Heretofore, when re-doing the vehicle seats, it has been necessary for an automotive restorer to seek out individuals who perform custom upholstery services. This, however, has oftentimes meant long delays in delivery and very expensive seat cushions. The difficulties of these efforts are often also compounded through the necessity of having to construct a custom framework to support the new upholstered cushions, since the early seat frames provided only minimal cushion suspensions, with limited lateral and longitudinal support. Moreover, such frameworks did not accommodate bolstered cushion sides and/or reclining actions.

SUMMARY OF THE INVENTION

In recognition of the foregoing shortcomings, the modularly constructed framework of the present invention was developed and whereby a variety of custom appearing, upholstered seat cushions may be fabricated for use in a variety of automobiles. Moreover, the frameworks of the present invention are adaptable to bench and split bench seats with or without armrests, and bucket seats, and in a fashion permitting reclining backrest action via a remotely-actuated tilt control means.

It is accordingly a primary object of the subject invention to provide a modular, upholster cushion seat framework adaptable to a variety of automobiles.

It is a further object of the invention to provide frameworks capable of supporting custom upholstered cushions for front or back seat use and in configurations ranging from independent bucket seats to bench seats to split bench seats with armrests.

It is a further object of the invention to provide frameworks with bench and backrest portions which independently tilt relative to one another.

It is a still further object of the invention to provide a framework including a remote tilt adjustment mechanism which may be built into the bolster of the cushion.

Yet another object of the invention is to provide a framework capable of supporting a seat belt retractor assembly.

The present invention particularly achieves the foregoing objects and advantages in a framework having independent, tubular bench and backrest portions which hinge to one another with exposed, chrome-plated hinge link members. Cross members provided with each frame portion and having uniformly spaced holes receive longitudinally mounting support springs. Associated rod members spaced away from and in parallel relation to the framework members receive wire clips which are secured through the upholstered fabric. Upright wing frame members secured to the sides of each bench and backrest frame support the foam padding and facilitate the shaping of side bolsters. A headrest coupler bracket also mounts to each backrest to slidably receive a separately upholstered headrest.

Mounted to the longitudinal side of the bench portion of each recliner seat is a cable-actuated, spring-loaded, variable throw rod assembly. The throw length of the rod is particularly variable relative to a lower end of one of the pivot link members to vary the angular adjustment of the seat's backrest portion relative to the bench portion.

The foregoing objects, advantages and distinctions of the invention, among others, as well as the details of its construction, will become more apparent upon reference to the following description with respect to the appended drawings. Before referring thereto, it is to be appreciated the following description is made by way of the presently preferred embodiment only, which should not be interpreted in limitation of the invention as claimed hereinafter. To the extent modifications or improvements may have been considered, they are described as appropriate.

DESCRIPTION OF THE PREFERRED EMBODIMENT

Figure 1:
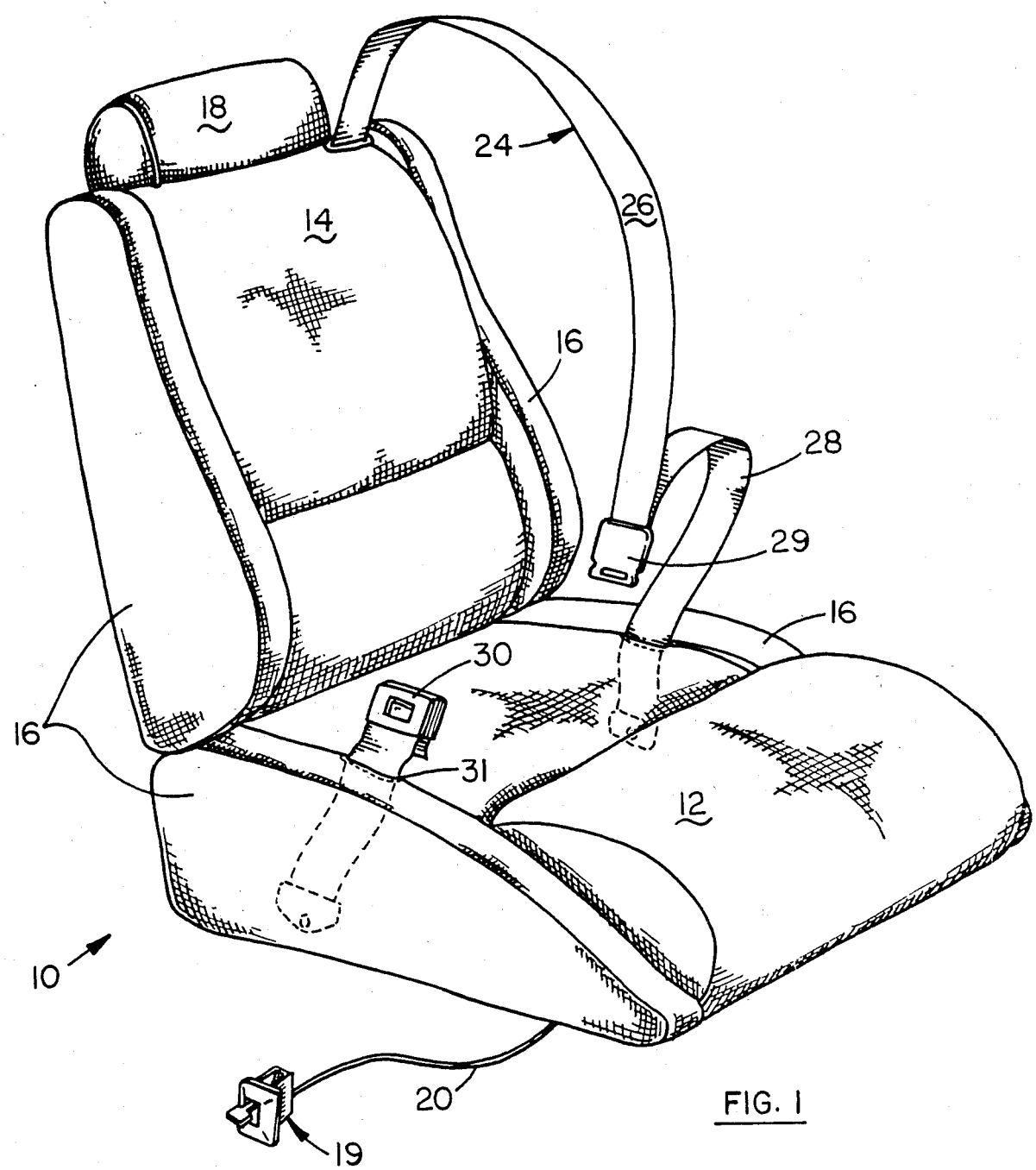
FIG. 1 shows an isometric view of an upholstered bucket seat with integral seat belt constructed around the framework of the present invention.
Figure 2:
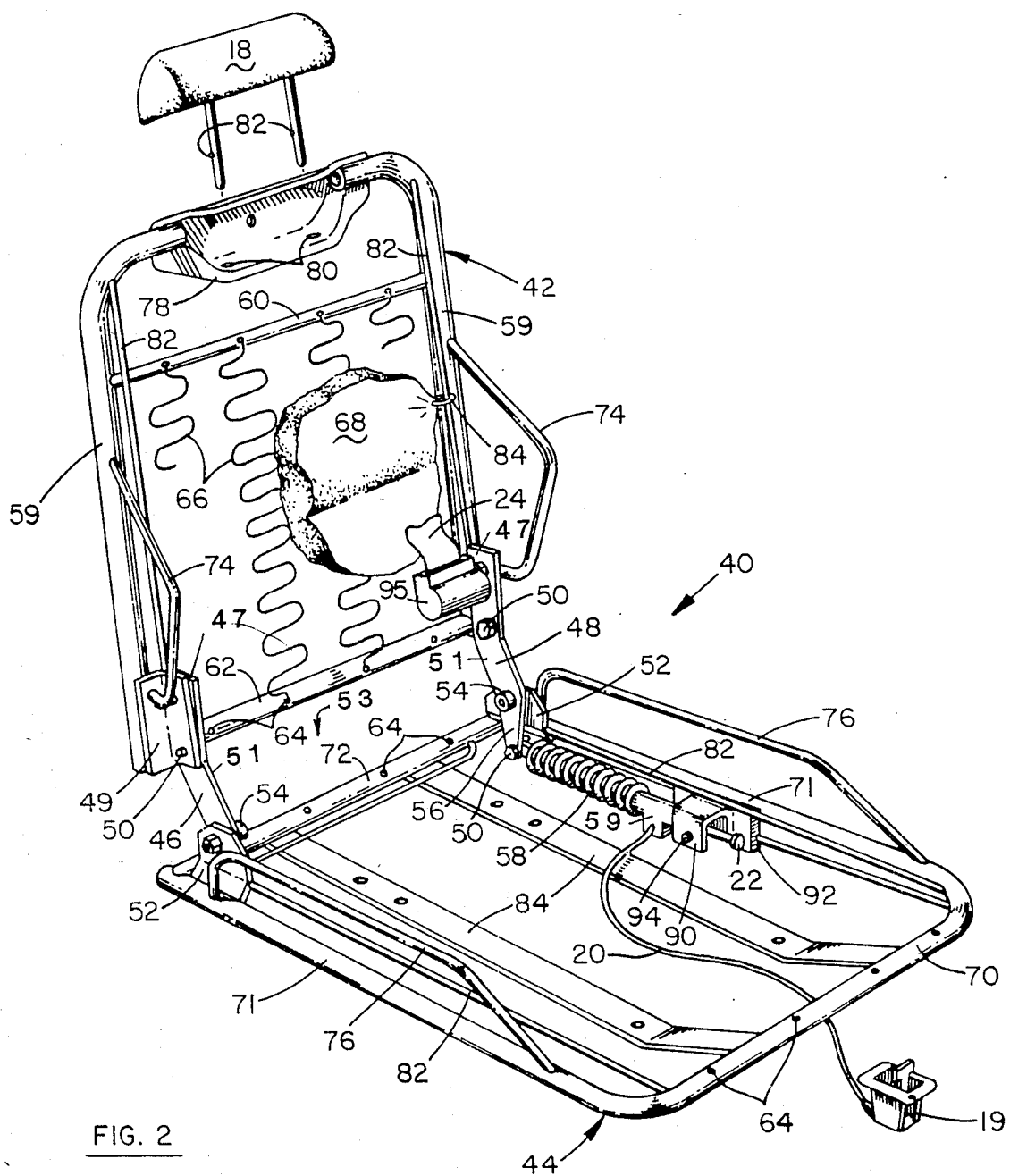
FIG. 2 shows an assembled isometric view of the framework of the bucket seat of FIG. 1.
Figure 3:
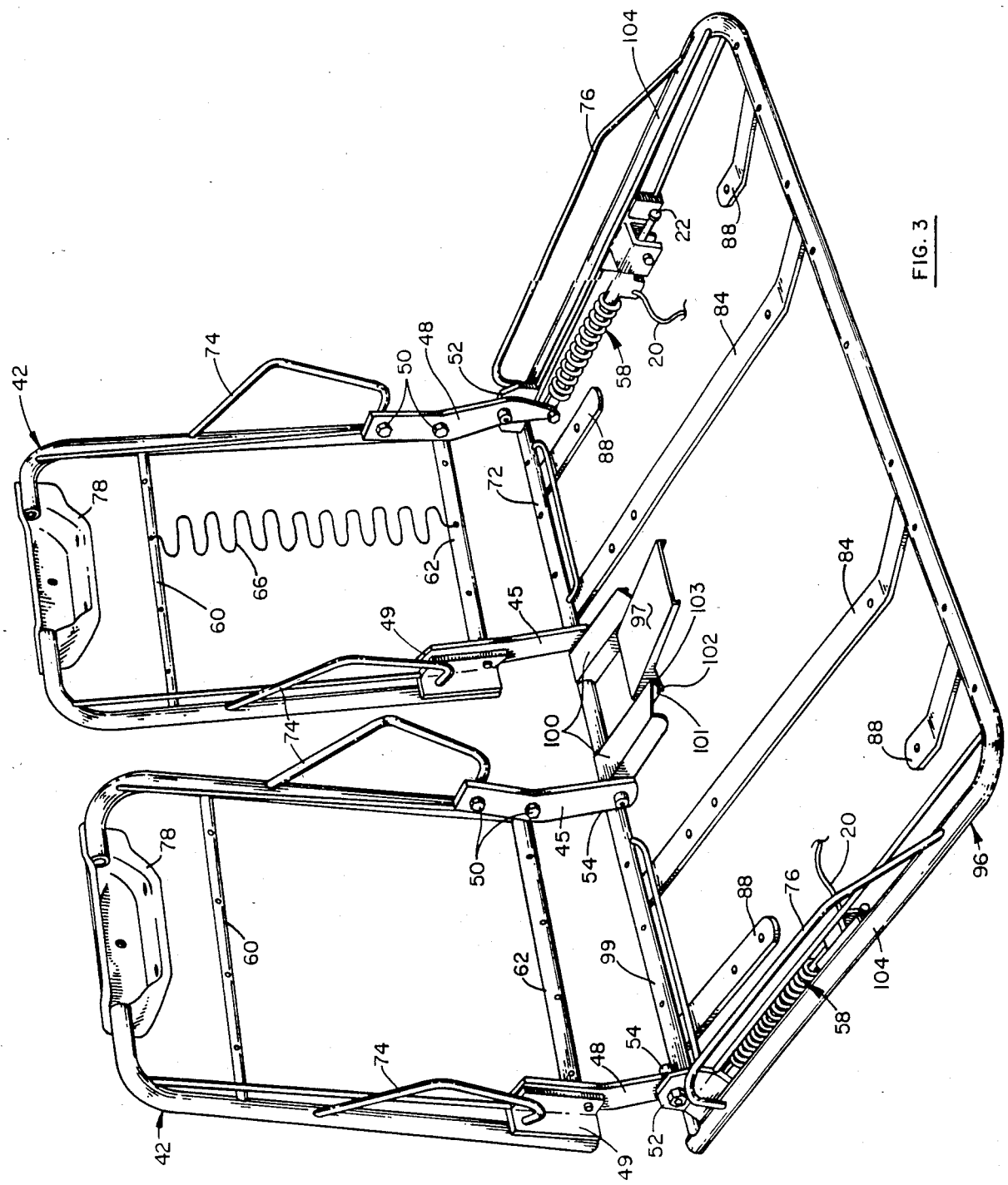
FIG. 3 shows an assembled isometric view of a bench type seat assembly including independent acting seat backs and an armrest.

Referring to FIG. 1, an assembled isometric view is shown of a bucket seat constructed using the modular framework of the present invention. FIG. 2, in turn, shows a detailed isometric view of the framework before it is upholstered in the fashion of FIG. 1. Although bucket seat constructions are particularly shown, it is to be appreciated the present framework is modularly configured such that bench type seat constructions may also be fabricated with or without reclining backrest portions or armrests. FIG. 3 shows one of these latter constructions wherein a split-back is provided, with each half separately reclining and intermediate of which is positioned an armrest.

Generally, though, the seat 10 of the present invention provides for an upholstered two-part seat having a seat cushion or bench portion 12 and a backrest portion 14. The sides of each bench and backrest portion 12, 14 are also formed to provide for raised side support bolsters 16 and a heat rest portion 18. The backrest portion is also reclinable by way of a remotely mounted lever assembly 19 which may be integrated into the upholstery in the region of one of the bolsters 16 or be separately mounted within the dashboard or a center console of the vehicle.

A cable 20 extends from the lever assembly 19 to operate a mechanism or recliner assembly 58 which grasps a spring-loaded longitudinally extensionable rod or arm 22 (reference FIG. 2) and thus provides for an infinite range of recliner positions over the length of the arm 22. An occupant may accordingly adjust the backrest position relative the bench seat 12 without undue effort.

Extending also out of the rear upper surface of the backrest is an over-the-shoulder seat belt assembly 24 which is coupled to a retractor secured internally of the backrest 14 to its framework. The over-the-shoulder portion 26 of the belt 24 extends from the retractor (not shown) and is secured at its opposite end to the vehicle chassis. A lap portion 28 of the belt 24 is defined by a buckle 29 which is slidably mounted to the belt 24 and which mounts to a mating buckle 30 and length of belt 31 secured to the vehicle chassis.

Such a belt mounting is in contrast to the typical mounting where all ends of the seat belt restraint are isolated from the seat framework. This is required due to the limited support provided by conventional frames. In contrast, the subject framework not only provides for a stylish, custom appearing upholstered seat at affordable prices, but does so in a framework which meets specified safety standards.

Turning attention to FIG. 2, a detailed assembly view is shown of the seat's inner framework 40. It is comprised of a pair of generally rectangular backrest and bench frames 42 and 44 which are hinged to one another via a pair of chrome-plated, hinge link members 46 and 48. Each link member is bolted to an upright flat iron bracket welded to the inner side edges of the frameworks. In particular, the upper end of each hinge member is bolted to an angle iron bracket 47 at the right and left sides of the backrest frame 42 with suitable bolt/nut fasteners 50, whereas the lower ends are pivotally secured with a single bolt to right and left brackets 52 which extend upward from the sides of the bench frame 44. A shouldered bolt/nut 54 is particularly used to form each pivot with the shoulder of each bolt providing for a slight lateral movement of each hinge member 46, 48. The nut fasteners of each pivot is also of a retainer type to prevent falling off over time.

Whereas too the left hinge member 46 terminates at its pivot bolt 54, the right member 48 includes a lower adjuster or extension portion 56 which extends downwardly to one end of the spring-loaded, longitudinally-mounted, recliner adjustment assembly 58. A through bolt 50 secures the portion 56 to one end of the assembly 58's throw arm 22.

The upper end 47 of each hinge member 46, 48 mounts in alignment with the backrest frame 42 and is offset rearward of the pivot bolts 54, approximately 1 1/2 inches via an angular portion 51 that extends downward and forward at an obtuse angle to the pivot bolts 54. A gap 53 is thus formed between the bottom of the backrest frame 42 and the back of the bench frame 44 and whereat the hinge arms are exposed once the frames are upholstered. The extension portion 56 of the hinge member 48 extends downward from the lower end of its angular portion 51. This constructional arrangement or hinge members 46, 48 relative to each other, the seat frames 42, 44, the recliner assembly 58 and the forward displacement of the pivot bolts 54 has been found to produce maximum mechanical advantage in all locked positions of the backrest frame 42.

As mentioned, each backrest and bench framework 42,44 is generally of a rectangular form with the corners of the inner edges at the hinge link members generally being squared and the outer corners in the region of the shoulder and knees of the seated rider being rounded. The depth of the various frameworks 42, 44 are formed to either 19, 20-1/2 or 22-1/2 inches, which dimensions are common for either the backrest or bench portions 42, 44 for all of the various seats. Frames of these dimensions have been found compatible with a range of classic Ford TM and Chevrolet TM automobiles from 1930 to 1948.

Extending between the side frame members 59 of the backrest 42 is an inner tubular rod support 60 which is spaced approximately 15-1/2 inches from a lower horizontal tubular member 62. Each of these members is formed with a plurality of spaced-apart holes 64 which receive conventional upholstery springs 66 secured in the holes 64 and provide longitudinal support to the cushion padding 68. The spacing between the horizontal spring receiving members 60, 62 is held constant from frame to frame, even though the overall depth of the frame may vary. Each bench frame 44 is similarly held to a uniform depth of 22-1/2 inches with spring receiving holes 64 provided in each of the front and rear horizontal members 70, 72.

Although the preferred embodiment uses conventional upholstery springs which generally are 2 to 3 inches wide and are formed of 1/8 inch spring stock bent to the zigzag shape shown, it is to be appreciated that other types of resilient support members might be strung between the frame members. In this regard, Applicant contemplates stretching a fibrous rubber membrane between the horizontal and side frame members to provide lateral and longitudinal support.

In combination with the present upholstery springs 66, upper and lower wing frame members 74 and 76 are welded to the right and left sides 59 and 71 of the frameworks 42, 44 to provide lateral support for the cushion padding 68 and the seated rider. The shape of the frames 74, 76 determines the shape of the bolsters 16. As depicted, the contour of each of the wing frames 74, 76 is constructed differently for the bench and back seat portions depending upon the ultimate style to be obtained. Whereas too the primary framework members are constructed of 1 inch tube stock, the wing frames 74, 76 are formed from 1/2 inch tube stock and are welded to the side 3/8 primary frame members 59 and 71.

Coupled also between the side frame members 59 of the backrest 42 portion is a headrest receiving bracket 78 which is welded to the side members. Pairs of provided holes 80 in this channel member receive detente containing spring arms 82 which are formed as part of an upholstered headrest 18 and slip fit through plastic sleeves (not shown) in the upholstery to the holes 80.

Also extending in parallel relation to the primary side frame members 59 and 71 are right and left upholstery clip retainer rods 82 which are formed from 3/16 inch rod stock. As the upholstery materials are stretched over the frameworks 42, 44, ring clips are pinched about these rods 82 in conventional fashion and restrain the materials to a formed shaped. Retainer rods 82 are also secured in parallel relation to the sides and front and rear horizontal members of the bench frame 44.

Also welded to the bottoms of the horizontal bench frame members are flat metal mounting members 84 which are shaped and drilled to mount to the floor of the automotive chassis with suitable bolt/nut fasteners. Depending upon the vehicle, additional members 84 may be provided or alternatively the spacing of the members may merely be increased. Similarly, in lieu of full-depth flat members 84, drilled tabs 88 (reference FIG. 3) may be welded to the front, rear and sides of the bench frame members to permit attachment to the vehicle floor.

Particular attention is next directed to the right hinge link member 48 of FIG. 2 and the spring-loaded recliner assembly 58. The recliner assembly 58, including the cable 20 and lever actuator 19, comprises a purchased assembly. As mentioned, it bolts at one end of the rear lower end 56 of the hinge link 48. The forward end mounts to the right side frame member 71 at an inverted U-shaped bracket 90 which is welded to an intermediate shim 92 and the right side frame member 71. Where a bench with tapered sides is constructed, the shim 92 may be deleted. A restraint pin 94 secures the fore-end of the assembly 58 to the bracket 90 and the extreme end of which pin 94 is drilled to receive a cotter pin (not shown).

Upon operating the lever actuator 19, an internal gripping member (not shown) at housing 59 and relative to the action of spring 61; grips/releases the longitudinally acting throw arm 22 of the assembly. As the rider leans back or forward to exert pressure or not against the previously positioned backrest 14 and simultaneously operates the lever, the backrest 14 may be brought to a desired angular orientation which is thereafter maintained, until changed in a similar fashion.

Also shown in FIG. 3 is the seat belt retractor assembly 95 which is secured to the back of one of the brackets 49. The belt 24 extends from the retractor 95 up and through the upper corner of the backrest 14 and mounts to the floor at its opposite end. The lap portion 28 of the belt mounts about the rider and to a mating coupler secured to the chassis.

Turning attention next to FIG. 3, an assembled isometric view is shown of a typical bench seat framework 96 of the present invention and to which a pair of separately hinged backrest frames 42 are mounted and between which a pivoting armrest 97 is secured, alternatively the armrest might be stationary mounted or not used at all. Similarly, the backrest might be solid all the way across.

As mentioned, the bench framework 96 differs from that of FIG. 2 primarily in its overall length, although the depth may be varied in the narrow range mentioned, depending upon the year and model vehicle. Although too a pair of flat mounting members 84 are provided, drilled tab members 88 are also shown which might be used in lieu of or in combination with the flat members 84.

Extending inwardly from the rear side corners of the frame are a pair of backrest brackets 52 of identical construction to those of FIG. 2. Mounted midway along the primary back frame member 99 and extending inwardly therefrom are a pair of multi-apertured U-shaped brackets (when viewed end-on) 100 which are welded to the frame member 99 and rear holes (not shown) on an inner side of which mate with the lower pivot holes of inner hinge members 45. A forward hole on the outer side of each bracket 100 supports a pivot pin member which, in turn, pivotally supports the armrest framework 97 and the cushion supported there around. Pins 102 extending from the sides of the framework 97 follow the forward edge of the brackets 100 between lowered and raised stop notches 101 and 103.

Mounted to the right and left side framework members 104 are the recliner assemblies 58 which are secured to the mating hinge members 48. Thus, the backrest frames 42 operate as before, but with the lever actuators 19 on the outer sides and relative to a center armrest 97.

Otherwise, each seat back portion 42 is constructed in a substantially similar fashion to that of the framework of FIG. 2. Alternatively for a rear seat or where a bench type front seat is desired, in lieu of separate recliner backrest frames 42, the backrest is configured as a rigid frame like the bench frame 96. In this instance, the backrest portion (not shown) is rigidly secured to the bench portion with a pair of end mounted link arms 48 and each of which are again secured to the bench and backrest portions with pairs of bolt/nut fasteners 50.

While the present invention has been described with respect to a number of alternative seat constructions, it is to be appreciated that still other constructions might suggest themselves to those of skill in the art upon reference hereto. Moreover, the construction is of a modular form, the present frameworks may be re-configured to meet the constraints of a variety of makes and models of automobiles. Accordingly, the following claims should be interpreted to include all those equivalent embodiments within the spirit and scope of the foregoing described invention.

What is claimed is:

1. An automotive seat framework comprising:
   (a) a backrest frame including a plurality of frame members;
   (b) a bench frame comprised of a plurality of frame members;
   (c) first and second hinge arms, each including a first integral portion rigidly coupled adjacent one of a pair of axially opposed corners of the backrest frame and a second integral portion angulating at an obtuse angle from one end of said first portion and means for pivotally coupling said second portion adjacent to one of a pair of axially opposed corners of the bench frame forward of a rearmost end of the bench frame, and wherein at least one of said first and second hinge arms includes a third integral portion extending at an obtuse angle from the other end of said second portion; and
   (d) means coupled between said third integral portion and the bench frame and including a longitudinal member mounting in parallel relation to a side of said bench frame and means for regulating the extension of said member for regulating the angle of said backrest frame relative to said bench frame.

2. An automotive seat framework comprising:
   (a) a planar backrest frame including a plurality of tubular frame members configured in a rectangular shape;
   (b) a planar bench frame comprised of a plurality of tubular frame members formed in a rectangular shape;
   (c) a plurality of brackets secured adjacent horizontally axially opposed ones of the corners of each of said backrest frame and said bench frame;
   (d) first and second hinge arms, each including a first integral portion rigidly coupled to one of the brackets of the backrest frame and a second integral portion angulating at an obtuse angle from one end of said first portion and means for pivotally coupling said second portion adjacent one of the brackets of the bench frame above the plane of the bench frame and forward of a rearmost end of the bench frame, and wherein said second hinge arm includes a third integral portion extending at an obtuse angle from the other end of said second portion; and (e) means including a longitudinally extensible rod member and cable actuated means for grasping said rod member, wherein said rod member is coupled at one end to said third portion and said grasping means is coupled to a side frame member of said bench frame for regulating the angle of said backrest frame relative to said bench frame.

3. An automotive seat framework comprising:

(a) first and second planar backrest frames, each including a plurality of tubular frame members configured in a rectangular shape;

(b) a planar bench frame comprised of a plurality of tubular frame members formed in a rectangular shape;

(c) a plurality of brackets secured adjacent axially opposed ones of the corners of each of said first and second backrest frames and said bench frame and between the corners of said bench frame;

(d) a plurality of hinge arms, each including a first integral portion rigidly coupled to one of the brackets of one of the backrest frames and a second integral portion angulating at an obtuse angle from one end of said first portion and means for pivotally coupling said second portion to one of the brackets of the bench frame above the plane of the bench frame and forward of a rearmost end of the bench frame, and wherein at least one of the hinge arms coupled to each of said first and second backrest frames includes a third integral portion extending at an obtuse angle from the other end of the second portion of the hinge arm; and (e) first and second means including a longitudinally extensible rod member and cable actuated means for grasping said rod member and wherein said rod member is coupled at one end to the third integral portion of one of the hinge arms and the grasping means is coupled to a side frame member of said bench frame, for independently regulating the angle of respective ones of said first and second backrest frames relative to said bench frame.

4. Apparatus as set forth in claim 3 including an armrest support member and means for independently pivotally coupling the support member to the bench frame between said first and second backrest frames.

5. Apparatus as set forth in claim 1 wherein each of said first and second hinge arms include shouldered bolt means for pivotally coupling and securing each of said first and second hinge arms to said bench frame.

6. Apparatus as set forth in claim 1 including a first and second seat belt straps, each strap having a buckle detachably mating with the buckle of the other strap and a at least one vehicle attachment portion and wherein at least one of the attachment portions of one of the straps is securable to the backrest frame.

7. Apparatus as set forth in claim 1 wherein each of said backrest and bench frames each include first and second wing frames projecting outward from opposite lateral side frame members.

8. Apparatus as set forth in claim 1 wherein said bench frame includes a plurality of flat mounting members extending between said horizontal members.

9. Apparatus as set forth in claim 1 wherein said bench frame includes a plurality of apertured tabs mounted to said framework for securing said framework to an automotive chassis.

10. Apparatus as set forth in claim 1 wherein an upper horizontal member of said backrest framework is split and a contoured headrest bracket including mating pairs of vertically aligned holes is secured therebetween.

11. Apparatus as set forth in claim 1 including a plurality of rod members secured to said backrest and seat frame members in parallel relation thereto for receiving fabric retainer clips.

12. Apparatus as set forth in claim 1 wherein said longitudinally extensible means comprises:

(a) a rod member mounted at one end to said third integral portion in the plane of the bench frame;

(b) a lever coupled via a cable to means for releasably grasping said rod; and (c) an inverted U-shaped bracket secured to said bench frame and to said grasping means.

* * * * *